(12) United States Patent
Park et al.

(10) Patent No.: US 9,141,700 B2
(45) Date of Patent: *Sep. 22, 2015

(54) SEARCH ENGINE OPTIMIZATION WITH SECURED SEARCH

(75) Inventors: Lemuel S. Park, Cerritos, CA (US);
Lennon Liao, San Mateo, CA (US);
Sammy Yu, San Mateo, CA (US);
Jimmy Yu, Foster City, CA (US)

(73) Assignee: BRIGHTEDGE TECHNOLOGIES, INC., San Mateo, CA (US)

( * ) Notice: Subject to any disclaimer, the term of this patent is extended or adjusted under 35 U.S.C. 154(b) by 577 days.

This patent is subject to a terminal disclaimer.

(21) Appl. No.: 13/431,809

(22) Filed: Mar. 27, 2012

(65) Prior Publication Data

US 2013/0173574 A1    Jul. 4, 2013

Related U.S. Application Data

(60) Provisional application No. 61/581,961, filed on Dec. 30, 2011.

(51) Int. Cl.
*G06F 17/30* (2006.01)
(52) U.S. Cl.
CPC ................................ *G06F 17/30864* (2013.01)
(58) Field of Classification Search
CPC .................................................. G06F 17/30864
USPC .......................... 707/706, 999.003, E17.108
See application file for complete search history.

(56) References Cited

U.S. PATENT DOCUMENTS

| | | | |
|---|---|---|---|
| 6,336,117 B1 * | 1/2002 | Massarani | 707/711 |
| 8,131,738 B2 * | 3/2012 | Gerber | 707/757 |
| 2004/0078224 A1 * | 4/2004 | Schramm-Apple et al. | 705/2 |
| 2008/0263048 A1 * | 10/2008 | Wise | 707/9 |
| 2012/0166413 A1 * | 6/2012 | LeBaron | 707/709 |

OTHER PUBLICATIONS

AJ Kohn, "Not Provided Keyword Not a Problem" (https://web.archive.org/web/20111123194827/http://www.blindfiveyearold.com/not-provided-keyword-in-google-analytics? ), Nov. 21, 2011, 1-7.*

* cited by examiner

*Primary Examiner* — Phong Nguyen
(74) *Attorney, Agent, or Firm* — Maschoff Brennan

(57) ABSTRACT

One example includes a method of attributing revenue to keywords for an entity having an entity website. The method may include obtaining the keywords used in a secured search on a search engine that result in a visit to an entity website and determining a position or rank of a webpage of the website on a search results page resulting from searching the keyword. The method may further include estimating, based on the rank of the webpage, a number of visits to the website that result from secured searches of the keyword.

19 Claims, 7 Drawing Sheets

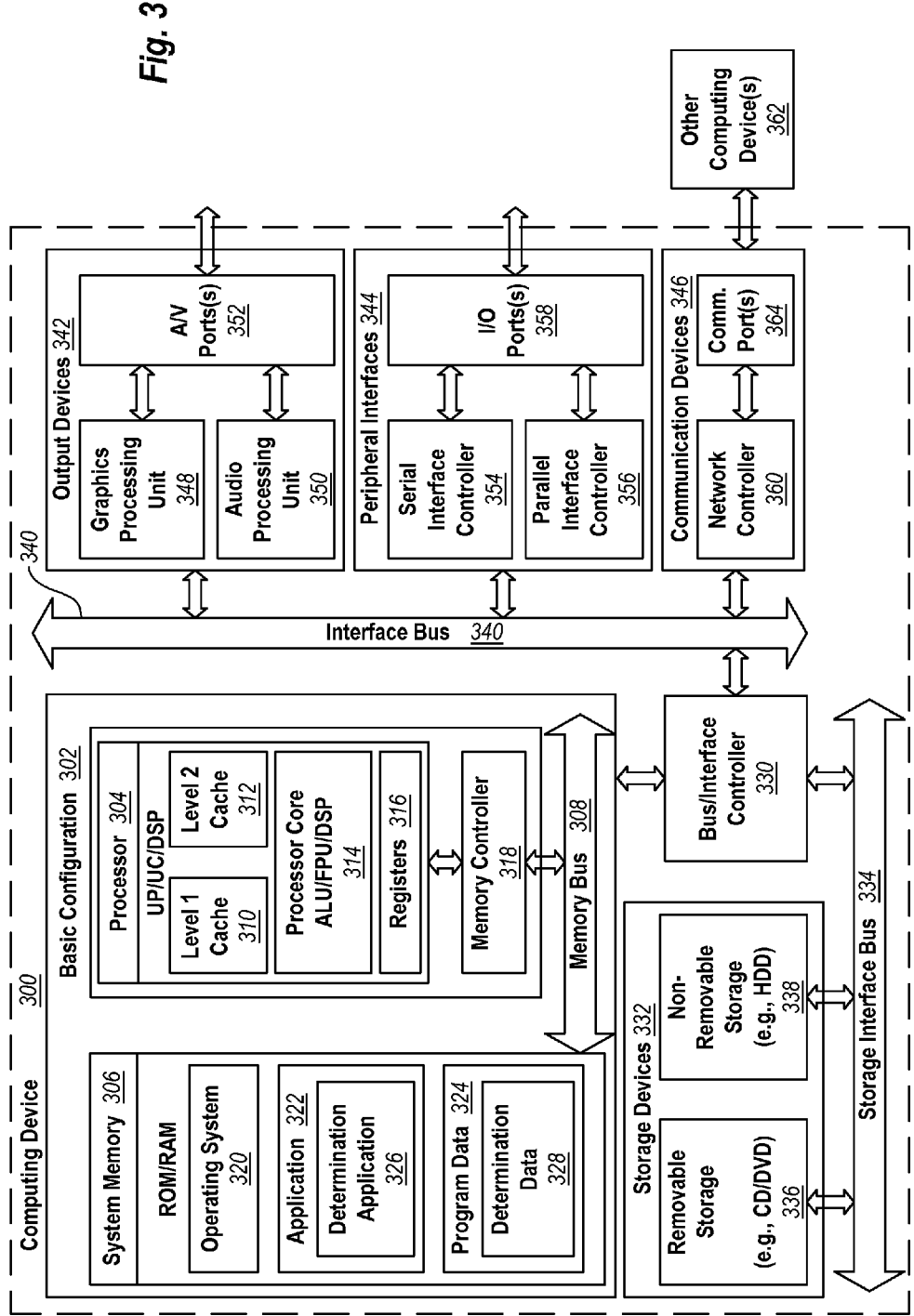

SEARCH ENGINE OPTIMIZATION WITH SECURED SEARCH

CROSS-REFERENCE TO RELATED APPLICATIONS

This patent application claims the benefit of and priority to U.S. Patent Application Ser. No. 61/581,961 entitled SYSTEM AND METHOD FOR ESTIMATING ORGANIC WEB TRAFFIC FROM A SECURED SOURCE, filed Dec. 30, 2011, which application is hereby incorporated by reference in its entirety.

BACKGROUND

Search engine optimization (SEO) generally describes the use of computing systems for running computing processes that collect, store, and analyze search engine data in order to provide recommendations to improve visibility of a website or a webpage in search engines. Search engine results can be obtained by one or more search strategies, such as natural, un-paid, organic, or algorithmic search results as well as for paid search algorithms of search engine marketing (SEM) target paid listings. Generally, the higher a website is located on a website listing and the more frequently a website appears in the search results list, the more visitors it will receive from the search engine's users.

SEO is implemented by Internet Technology (IT) professionals to improve the volume and quality of traffic to a given webpage or other Internet site. Typical techniques include keywords in title tags, keywords in meta tags, keywords in body text, anchor text in inbound links, age of site, site structure, link popularity in a site's internal link structure, amount of indexable text/page content, number of links to a site, popularity/relevance of links to site and topical relevance of inbound link tags, any of which can include SEO data. Additional techniques are sometimes employed based on the search engine for which the webmaster is attempting to optimize. Since search engine algorithms and metrics are proprietary as opposed to publicly available, search engine optimization techniques including the use of algorithms and metrics in conjunction with a computer or computing system are widely used to improve visibility of a webpage or other Internet site on search engine result pages. Entities, such as companies and individuals, may employ SEO to improve the volume and quality of traffic to their websites to increase sales, brand recognition, dissemination of their product, advertising, or for any other purpose.

Recent transitions by search engines include increased use of an encryption protocol called Secure Sockets Layer (SSL) in order to adopt stronger security standards. SSL and its predecessor Transport Layer Security (TLS) are useful in preventing eavesdropping and tampering of users' communication across a network. Hypertext Transfer Protocol (HTTP) is a widely used networking protocol for the World Wide Web. Hypertext Transfer Protocol Secure (HTTPS) is a combination of HTTP with SSL/TLS protocol to provide encrypted communication and secure identification of a network web server.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In general, example embodiments relate to attributing revenue to a keyword resulting in visits to a website.

In one example embodiment, a method for determining revenue attributable to keywords used in a secured search is disclosed. The method may include obtaining a keyword used in a secured search that resulted in a visit to a website. The method may also include determining a rank of a webpage of the website on a search results page resulting from searching the keyword. The method may also include estimating, based on the rank of the webpage, a number of visits to the website that result from secured searches of the keyword.

In another example embodiment, a method for determining revenue attributable to keywords used in a secured search is disclosed. The method may include obtain SEO data including a keyword used in the secured search that resulted in visits to a webpage. The module may also obtain SEO data including at least one revenue attribution metric. The module may then determine a rank of a webpage on a search results page resulting from searching the keyword. Based on the rank of the webpage, the module may then estimate a number of visits to the website that result from secured searches of the keyword. The module may then generate a report based on the SEO data obtained indicating an aggregate value of the keyword.

In yet another example embodiment, a computer readable medium is disclosed. The computer readable medium may be encoded with a computer program having computer-executable instructions for causing a computing system to perform operations for determining revenue attributable to keywords used in a secured search. The operations of the computing system may include first obtaining SEO data. The SEO data may include a keyword used in the secured search that resulted in visits to a webpage. The SEO data may also include a predetermined value of the keyword to the webpage. The SEO data may also include a percentage value assigned to the rank of the webpage. The operations of the computing system may also include determining a rank of a webpage on a search results page resulting from searching the keyword. The operations of the computing system may also include estimating a number of visits to the website that result from secured searches of the keyword based on the number of searches performed during a period within the search engine using the keyword and a predetermined percentage value based on the rank of the webpage.

These and other aspects of example embodiments of the invention will become more fully apparent from the following description and appended claims.

BRIEF DESCRIPTION OF THE DRAWINGS

To further clarify various aspects of some embodiments of the present invention, a more particular description of the invention will be rendered by reference to example embodiments thereof that are illustrated in the appended drawings. It is appreciated that these drawings depict example embodiments of the invention and are therefore not to be considered limiting of its scope. The invention will be described and explained with additional specificity and detail through the use of the accompanying drawings in which:

FIG. 3 illustrates an embodiment of a computing system that can implement some embodiments described herein, are arranged in accordance with at least one of the embodiments described herein, and which arrangement may be modified in accordance with the disclosure provided herein by one of ordinary skill in the art.

DETAILED DESCRIPTION

Figure 1A:
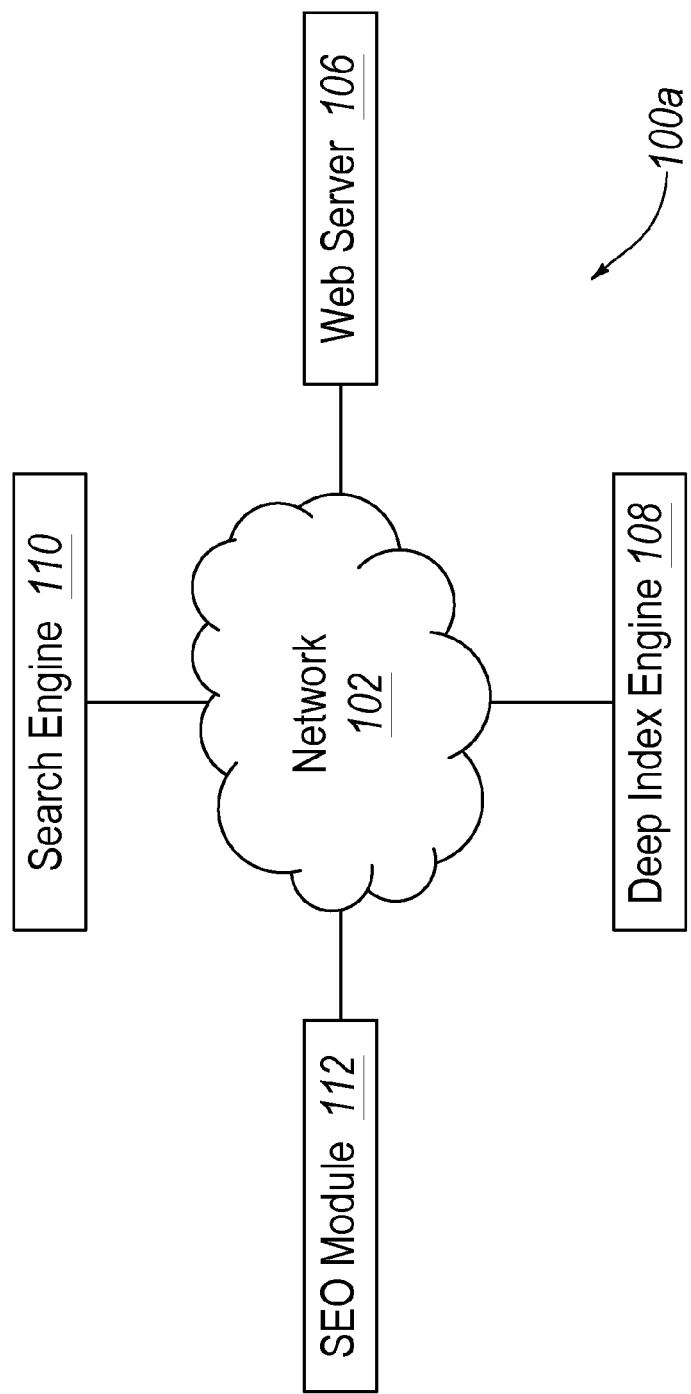
FIG. 1A illustrates an embodiment of a SEO system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Recently search engines have begun to use secured searches and in particular secured organic searches. One type of secured search may be implemented using a protocol called the Hypertext Transfer Protocol Secure (HTTPS). Some searches may be performed through nonsecured searches through a search engine. In addition, some nonsecured searches may be performed using toolbars such as the Google Toolbar. However, in a secured organic search, when a user selects a website or webpage from a secured search results page, the user is directed to the website or webpage by the secured search results page. The search engine may indicate to the website or webpage that the incoming traffic was directed from a secured search results page, however, no further data may be transmitted to the website. Thus, for the portion of visitors who are referred to a website through a search engine utilizing secured search, an entity associated with the website (including the website proprietor, webmaster, SEO manger, or the like) may be able to determine that the visitor came through a keyword search, but not determine the keywords used in keyword searches that drove traffic to the entity's website. A keyword may be any input used by a search engine to develop a search result webpage or list based on that keyword. The term "keyword" may refer to a single word, including numbers, symbols, or any combination of single words, numbers, and symbols.

Traditionally, when a visitor visits an entity's website, the entity may be able to determine some or all of the keywords used in the original keyword search that drove traffic to the entity's website. Thus, previously an entity may have easily determined keywords that produced higher quantities of traffic and attribute revenue, herein termed "SEO revenue attribution," to keywords. Furthermore, the entity may have further optimized the website for the keywords to further increase or maintain the traffic generated by the keyword. However, as noted, with the introduction of secured search, SEO revenue attribution has become more restricted.

Accordingly, embodiments disclosed herein generally relate to the use of computing systems and computing processes to perform, among other things, a method for determining revenue attributable to keywords used in a secured search.

In one embodiment, a computer implemented method for attributing revenue to keywords for an entity having an entity website is included. The computer implemented method, may require that a sample of the top key words driving traffic to a website be obtained, from which a selected keyword is designated. For the selected keyword, a rank of the website within the organic keyword search is determined using the selected keyword. A percentage value, herein termed a "Click Through Rate" (CTR) may be determined. The CTR may be a predetermined percentage value. The CTR may represent the percentage of visits to an entity's website that will occur based on the rank of a webpage of the entity within the organic keyword search. The number of secured searches using the keyword within a given search engine is then obtained from the search engine. The CTR is then used to determine an estimated number of visits to the entity's website by multiplying number of secured searches using the keyword by the CTR. The entity may also predetermine an amount of revenue that is generated by a user visiting the website that is directed to the webpage by searching for the keyword. Revenue attribution is then determined by multiplying the estimated number of visits generated by the selected keyword by the predetermined revenue per visit associated with the selected keyword.

Alternately or additionally, in some embodiments, the entity may also create a user-defined template by grouping webpages together based on the frequency of related keywords appearing within the webpage, and monitoring the traffic to the user-defined webpages resulting in a product or service being purchased by a customer. An example of such user-defined templates according to some embodiments is described in more detail in copending U.S. patent application Ser. No. 12/855,668 entitled OPERATIONALIZING SEARCH ENGINE OPTIMIZATION, filed Aug. 12, 2010, which application is hereby incorporated by reference in its entirety. The functionalities described herein can be applied to optimizing webpages for a website including determining an aggregate revenue value for a keyword as discussed in more detail below.

Alternately or additionally, in some embodiments, the keywords driving traffic to a website may be the result of only nonsecured searches within the search engine. In some embodiments, the keywords driving traffic to a website may be the result of only secured searches within the search engine. In yet another embodiment, the keywords driving traffic to a website may be the result of a combination of either secured or nonsecured searches within the search engine. Likewise, the number of secured searches using the keyword within a given search engine may be obtained from the search engine listing the number of nonsecured searches, the number of secured searches, or a combination of either secured or nonsecured searches using the keyword within a search engine.

Reference will now be made to the figures wherein like structures will be provided with like reference designations. It is understood that the figures are diagrammatic and schematic representations of some embodiments of the invention, and are not limiting of the present invention, nor are they necessarily drawn to scale.

FIG. 1 illustrates an operating environment, including a SEO system 100a, which can include a network 102. In some embodiments, the network 102 can be used to connect the various parts of the system 100a to one another, such as between a web server 106, a deep index engine 108, a search engine 110, and a SEO module 112. It will be appreciated that while these components are shown as separate, the components may be combined as desired. Further, while one of each component is illustrated in FIG. 1A, the system 100a may optionally include any number of each of the illustrated components.

The network 102 may include the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network 102 may include one or more cellular RF networks and/or one or more wired and/or wireless networks such as, but not limited to, 802.xx networks, Bluetooth access points, wireless access points, IP-based networks, or the like. The network 102 can also include servers that enable one type of network to interface with another type of network.

The web server 106 can include any system capable of storing and transmitting a webpage to a user. The web server 106 can provide access to the webpages of a website to be analyzed for improving SEO. For example, the web server 106 can include a computer program that is responsible for accepting requests from clients (user agents such as web browsers), and serving them HTTP and HTTPS responses along with optional data contents, which can include HTML documents and linked objects for display to the user. Alternately or additionally, the web server 106 can include the capability of logging some detailed information, about client requests and server response, to log files.

The website can include any number of webpages. The aggregation of references to the various webpages can be referred to as "traffic." References to a website or a webpage can include any reference to the webpages of a website, which directs a visitor to the webpage. It should be noted that webpage as used herein refers to any online posting, including domains, subdomains, web posts, Uniform Resource Identifiers ("URIs"), Uniform Resource Locators ("URLs"), images, videos, or other piece of content and non-permanent postings such as e-mail and chat unless otherwise specified.

In some embodiments, the deep index engine 108 is configured to use identified search terms related to one or more webpages of the website in order to perform a search of the network to identify ranking of webpages in the website. The deep index engine 108 may be further configured to score the results of the search network with respect to the webpages of the website. This score may include a rank or position at which a particular webpage is displayed within the search results with regard to a keyword or keyword combination. The relative position or rank of the webpages within the search result can affect how the keyword or keyword combination affect actions of a search engine relative to a webpage. Accordingly, by determining the relative position of the webpages of a website within search results, the deep index engine 108 may be able to determine a current performance metric for each of the webpages and/or search terms as they relate to the website.

Alternately or additionally, the deep index engine 108 may be configured to score the search results for each of the search terms with respect to other entities, including entities found in the competitive listing for the search results. Accordingly, the deep index engine 108 may be configured to gather external data related to performance of the webpages of the website.

Alternately or additionally, the deep index engine 108 may be configured to crawl the search results related to each of the search parameters to retrieve external data. In particular, the deep index engine 108 may be configured to crawl the search results for each of the search terms and analyze data associated with the crawl, including on-page information and back link data (e.g., back link URL, anchor text, etc.) for each URL in the search result. The deep index engine 108 may then analyze the data to identify additional search terms that may be relevant for each webpage, but which may not have been searched or on which the webpages do not rank. In some embodiments, this analysis may include conducting a keyword frequency search. Accordingly, the deep index engine 108 may be configured to surface additional search terms for relation to the webpages of the website. In some embodiments, these additional search terms and opportunities are identified and targeted in any channel (e.g., SEO, paid search, social networks, etc.). Cross-channel opportunities are also a part of the opportunity identification (e.g., if a customer is not ranking on a keyword on organic search that a competitor ranks on, the customer can immediately target this keyword in paid search).

A deep index engine 108 according to some embodiments is described in more detail in copending U.S. patent application Ser. No. 12/436,704 entitled COLLECTING AND SCORING ONLINE REFERENCES, filed May 6, 2009, which application is hereby incorporated by reference in its entirety. The functionalities described herein can be applied to optimizing webpages for a website including determining an aggregate revenue value for a keyword.

The SEO module 112 may be configured for orchestrating and performing operations for obtaining an aggregate value of a selected keyword. The SEO module 112 may obtain the keywords used in a secured search that resulted in a visit to an entity's website by crawling the webpages 152 as needed. The SEO module 112 may then use a rank or a position, such as a pixel position, of an entity's webpage on a search results page to estimate the number of visits to the entity's website as a result of secured searches of the keyword. The SEO module 112 may then obtain the aggregate revenue value of the keyword based on number of visits and a value of the selected keyword, such as a predetermined revenue per visit for the keyword.

Figure 1B:
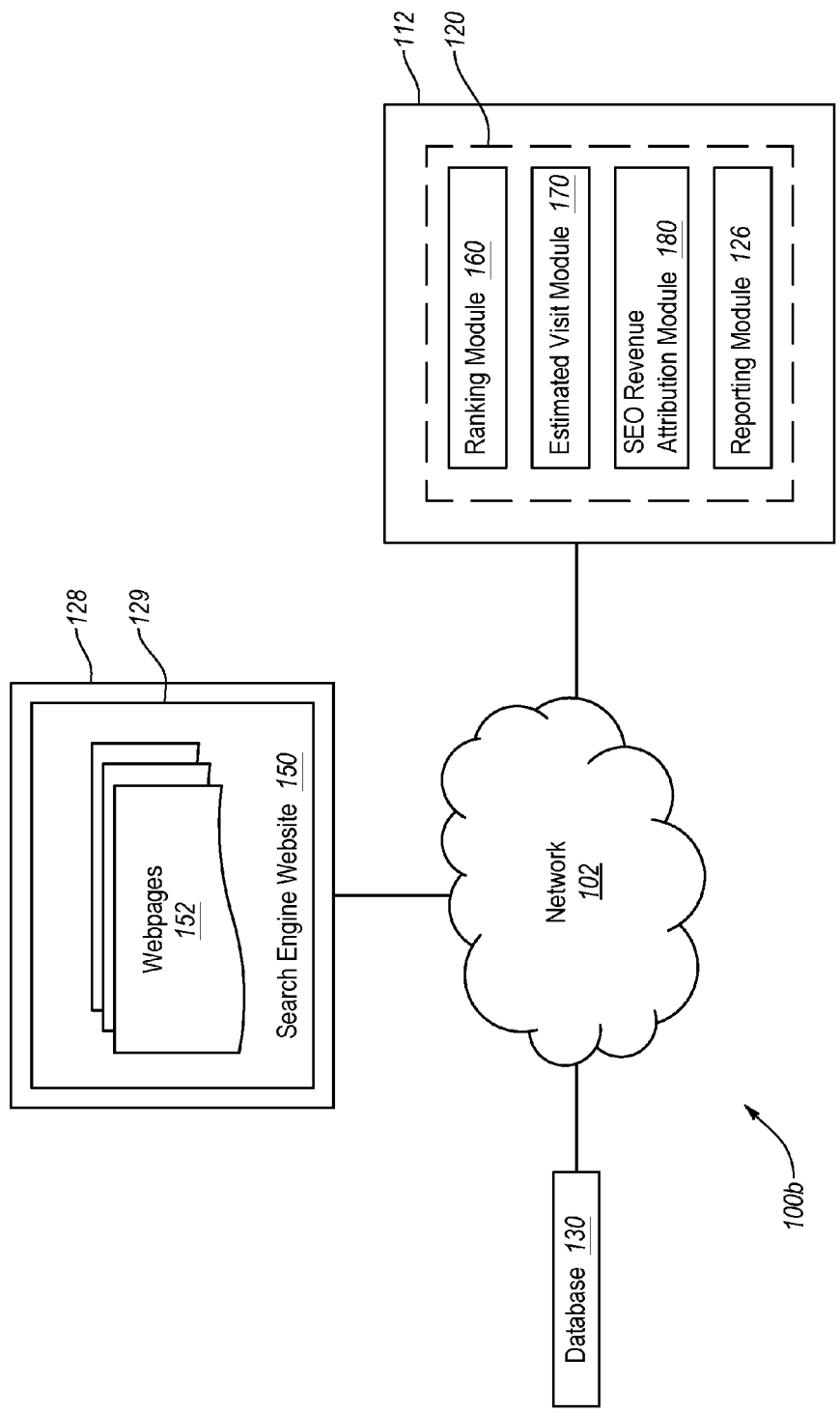
FIG. 1B illustrates another embodiment of a SEO system.

FIG. 1B illustrates another embodiment of a SEO system 100b. As shown, the network 102 operably couples the SEO module 112 with a website computing system 128. The SEO module 112 includes an SEO computing system 120 configured to perform SEO analysis and produce recommendations as described herein. The SEO computing system 120 can include submodules for implementing particular functionalities. The SEO computing system 120 can be generic to and include a ranking module 160, an estimated visit module 170, a SEO revenue attribution module 180, and a reporting module 126. A SEO computing module 120, including the reporting module 160, the estimated visit module 170, the SEO revenue attribution module 180, and the reporting module 126, according to some embodiments, are described in more detail in copending U.S. Patent Application Ser. No. 61/581,961 mentioned previously, filed Dec. 30, 2011.

The SEO module 112 may communicate with a website database 129 through the network 102. The website database 129 can include webpages 152, such as search result webpages, of the search engine website 150. The website database 129 can further include webpages 152 relating to statistical data for keyword driven traffic within the search engine website 140, such as a webpage within Google Adwords, or Google Webmaster Tools displaying statistical data for keyword driven searches. It should be understood that the data from the search engine result webpages 152 may be stored in any configuration without departing from the embodiments described herein.

The website computing system 128 can obtain SEO data from the search engine result webpages 152 by accessing the search engine website 150 through a web server, such as the web server 106 of FIG. 1A. Furthermore, the search engine result webpages 152 can be collected by crawling the webpages 152. In some embodiments, the webpages 152 can be crawled using the deep index engine 108 of FIG. 1A, for instance. In some embodiments, the webpages 152 can be crawled using a different mechanism.

Referring again to the SEO computing module 120, the ranking module 160 within the SEO computing module 120 can be configured to analyze the webpages 152 of the search engine website 150, obtain one or more metrics, SEO data, or both from the webpage 152. The ranking module 160 can include one or more algorithms for analyzing the data from the webpages 152. For example, in some embodiments, the ranking module 160 can analyze on-page data references to the entity webpages to identify the rank of the entity webpages within search result webpages 152 of the search engine website 150.

The estimated visit module 170 can obtain data from the ranking module 160 and the webpages 152, and can be configured to determine an estimated number of visits to a website resulting from a secured keyword search on the search engine website 150 using the selected keyword. The estimated visit module 170 can include one or more algorithms for processing the data obtained from the ranking module 160, the webpages 152 relating to keyword statistics, and the database 130 containing predetermined values. Based on the data from the ranking module 160, the webpages 152 relating to keyword statistics, and the database 130 containing predetermined values, the estimated visit module 170 can multiply the number of secured searches performed by the CTR to determine an estimated number of visits to the website that result from secured searches of the keyword.

Alternately or additionally, the estimated visit module 170 can obtain data from the user-defined template discussed above with reference to the copending U.S. patent application Ser. No. 12/855,668. Specifically, the estimated module 170 may determine the number of visits to a webpage or a group of webpages having a higher frequency of related keywords appearing within the webpage or webpages, and monitor the traffic to the user-defined webpages resulting in a product or service being purchased by a customer. Based on the data from the user-defined template traffic, the estimated visit module 170 can multiply the number of estimated visits based on a sampling of keywords appearing at a higher frequency within the webpage, or groups of webpages, by the CTR to determine an estimated number of visits to the website that result from secured searches of the keyword. Further, the sampling of keywords may be used by the ranking module 160 to determine the rank or position of the entity's website for the sampling of keywords. Thus, the ranking module 160 may determine the rank or position of keywords provided from resources beyond the keywords provided from webpages 152 relating to statistical data for keyword driven traffic within the search engine website 140 discussed above.

The SEO revenue attribution module 180 can obtain data from the estimated visit module 170, and from the database 130 containing predetermined values, and can be configured to determine an aggregate value for the selected keyword. The SEO revenue attribution module 180 can include one or more algorithms for processing the obtained data. Based on the data from the estimated visit module 170 and from the database 130 containing predetermined values, the SEO revenue attribution module 180 can multiply the estimated number of visits with a predetermined value per visit to determine an aggregate value for the selected keyword.

The reporting module 126 can compile information from the ranking module 160, and/or the estimated visit module 170, and/or the SEO revenue attribution module 180, to generate a report of the SEO revenue attribution including the aggregate value for the selected keyword. The reporting module 126 can include one or more algorithms that can generate one or more reports relating to the aggregate value.

Figure 2A:
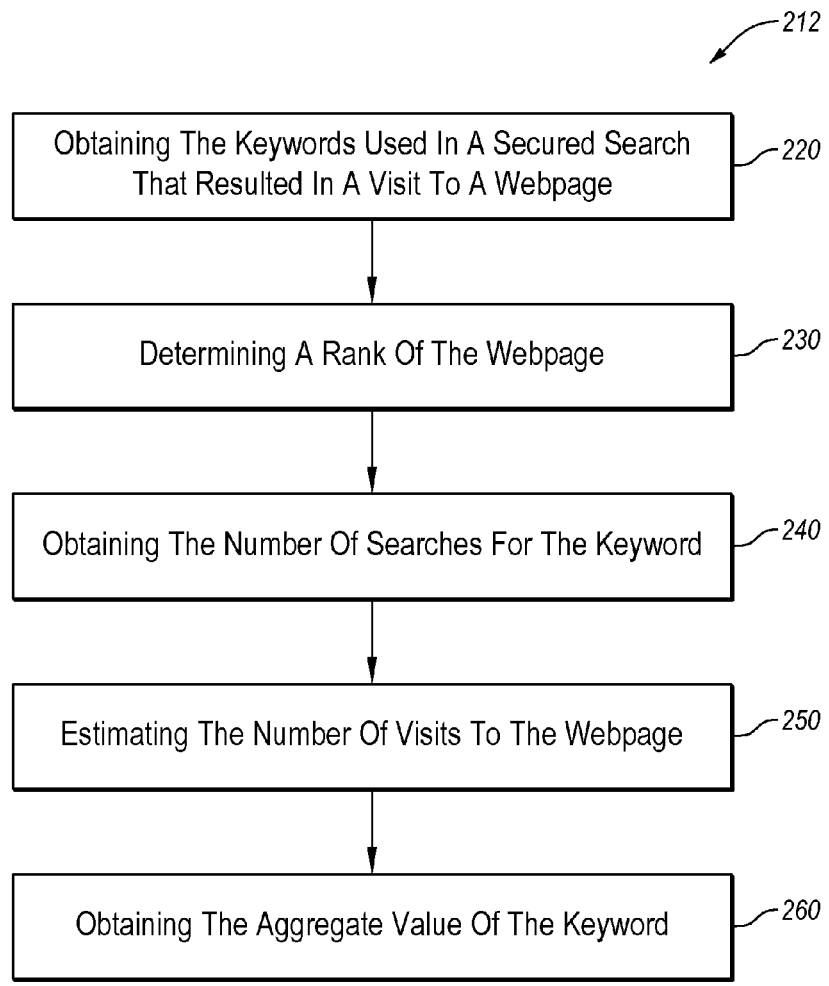
FIG. 2A illustrates a method for determining revenue attributable to keywords used in a secured search.

FIG. 2A illustrates a method for determining revenue attributable to keywords used in a secured search that may be performed by a computing system, such as the SEO module 112 of FIG. 1. Alternately or additionally, the computing system may be the SEO module 112 of FIG. 1B. The method for determining revenue attributable to keywords used in a secured search according to some embodiments is described in more detail in copending U.S. Patent Application Ser. No. 61/581,961 mentioned above.

In some embodiments, as shown in FIG. 2A, the method 212 may include the steps of obtaining the keywords used in a secured search that resulted in a visit to a webpage (block 220), determining a rank of the webpage on a search results page resulting from securely searching the keyword (block 230), obtaining the number of secured searches for the keyword (block 240), estimating, based on the rank of the webpage, a number of visits to the website that result from secured searches of the keyword (block 250), and obtaining the aggregate value of the keyword (block 260).

Alternately or additionally, the number of visits to the website that resulted from a secured search of the keyword (block 250) may be estimated by obtaining data relating to the number of visits to individual webpages of the website, from which the number of visits to the website can be determined by relative scale.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Obtaining the keywords (block 220), shown in FIG. 2A, may include obtaining from a commercial search engine, or any search engine the keywords resulting in traffic to an entity's website. Obtaining the keywords (block 220) may also include obtaining keywords from data including, but not limited to: toolbar data, API data, aggregated demographic data, aggregated log data, and the like. Further, obtaining the keywords (block 220) may also include obtaining the keywords from a sampling of keywords from a user-defined template as discussed above. In some embodiments, only a limited number of keywords may be obtained from a search engine. Furthermore, only the limited number of keywords used over a period may be obtained from a search engine. For example, the Google search engine may only provide the top 1000 keywords that drove traffic to an entity's website during the last 30 days through Google Webmaster Tools.

Figure 2B:
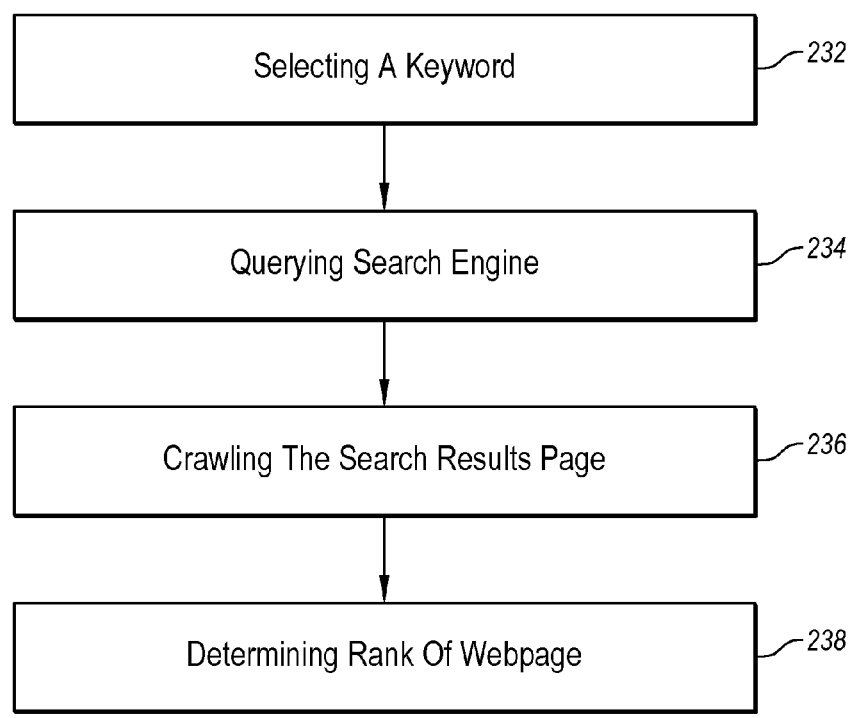
FIG. 2B illustrates a method for determining the rank of a webpage.

Determining the rank of a webpage for a keyword (block 230 of FIG. 2A) of the SEO module 212, may include, in some embodiments, performing a method 231 shown in FIG. 2B. In some embodiments, the method 231 may be performed by the ranking module 160 illustrated in FIG. 1B. From the keywords determined (block 220 of FIG. 2A) in the method 212 of FIG. 2A, one keyword is selected (block 232 of FIG. 2B). The keyword may be selected at random, manually, chronologically, in sequence beginning with the keywords most frequently driving traffic to the entity website, or automatically for every keyword listed in the keywords determined (block 220 of FIG. 2A) in the method 212 of FIG. 2A.

After selecting a keyword (block 232 of FIG. 2B), the keyword is used in a search engine query (block 234 of FIG. 2B). The search engine query uses the keyword to generate a search results page in a search engine website. The search results page results may be crawled to collect the results of the search engine query from the search results page (block 236 of FIG. 2B). Once the search has been performed, data may be collected determining the entity's website ranking by reference to the position of the entity's webpage beginning from the topward portion of the page downward in relationship to other listed search results (block 238 of FIG. 2B). Alternately or additionally, the steps of determining the rank may be performed by a deep index engine. Other steps, in addition to or in alternative to, the steps illustrated in method 231 may also be performed to determine a rank of a webpage.

Estimating the number of visits to the webpage (block 240) of the method 212 may include additional steps. Example steps may be illustrated in FIG. 2C. The number of secured searches performed for the selected keyword may be obtained by referencing such sites as Google Adwords, or the like (block 242 of FIG. 2C). Additionally, the CTR percentage value for a keyword may be obtained by referencing the database 130 (shown in FIG. 1B) where a predetermined CTR value is stored (block 243 of FIG. 2C).

In some embodiments, the CTR value may be predetermined by the entity based on an evaluation of a page rank for the entity's website achieved when searching the keyword. In some embodiments, the CTR value may be a value associated with how likely a user that performs a search is to visit a website based on the ranking of the website in the search results page. For example, a rank of "first" may be associated with generating a webpage visit 40% of the time when a search is performed whereas a rank of "tenth" may be associated with generating a webpage visit 10% of the time when a search is performed. The CTR assignment may be based on statistical analysis, brand recognition assumptions, keyword association assumptions, metrics relating to the cost per click value of the keyword associated with advertising platforms such as Google Adwords, and the like. Other metrics such as average orders, the number of conversions obtained from an analytics webpage such as Google Webmaster Tools, and/or the like.

Figure 2C:
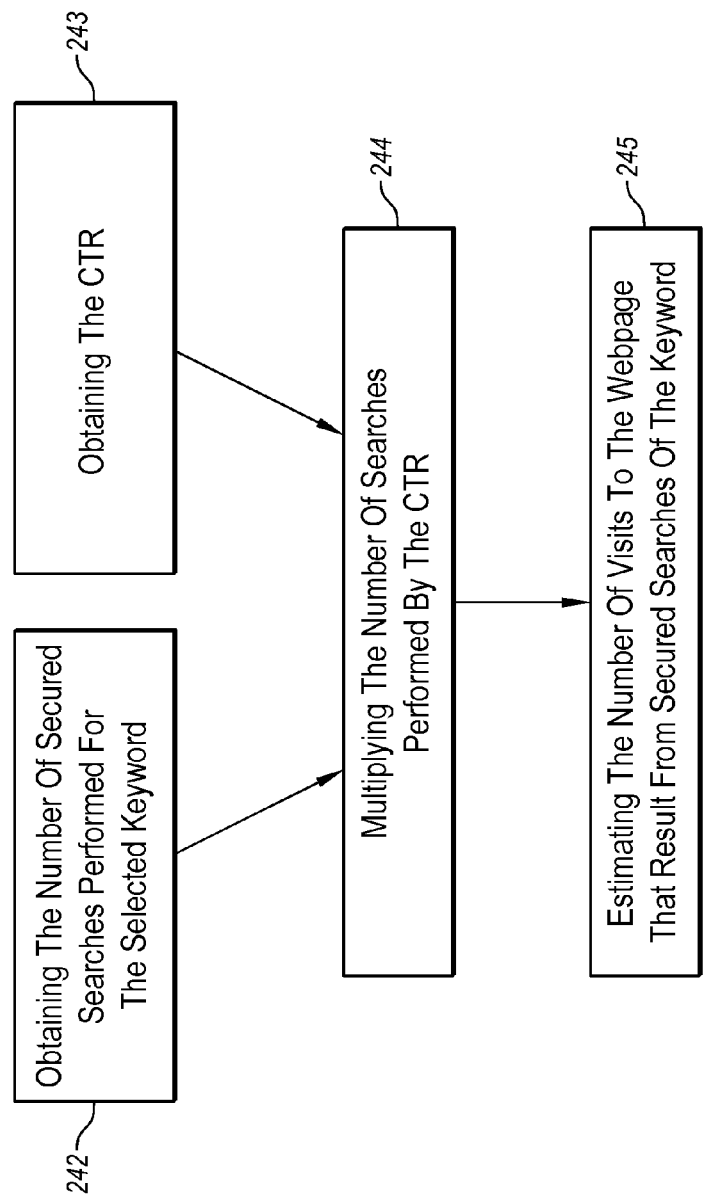
FIG. 2C illustrates a method for determining the estimated number of visits to an entity website.

After obtaining the number of searches and the CTR, the obtained number of secured searches may be multiplied by the obtained CTR value (block 244 of FIG. 2C) to estimate the number of visits to the webpage that result from secured searches of the keyword (block 245 of FIG. 2C).

Figure 2D:
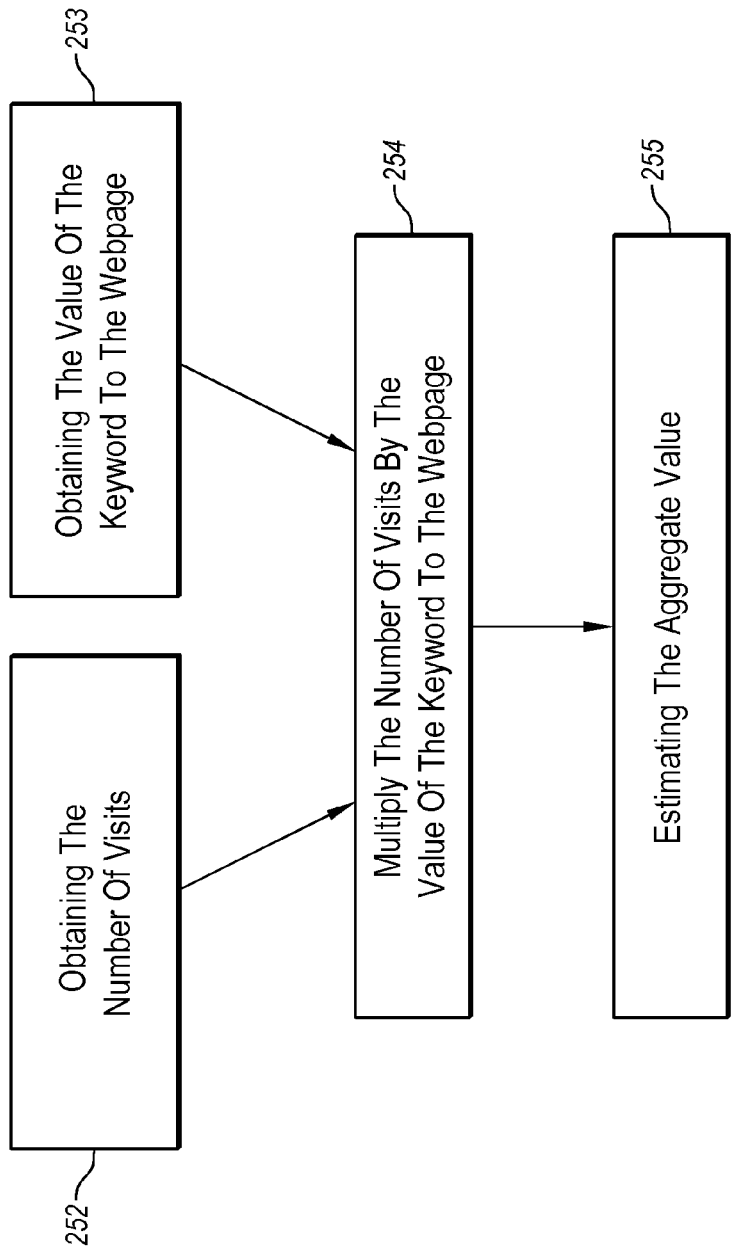
FIG. 2D illustrates a method for obtaining an aggregate value of a selected keyword.

Determining an aggregate value for the selected keyword (block 260 of FIG. 2A) of the SEO module 212, may include additional steps. Example steps may be illustrated in FIG. 2D. The number of estimated visits may be obtained (block 252 of FIG. 2D) by referencing the steps shown in FIG. 2C. In addition, a value of the keyword may be obtained by referencing the database 130 (shown in FIG. 1B) where a predetermined value per visit is stored (block 253). The predetermined value per visit may be assigned by the entity based on statistical analysis, brand recognition assumptions, keyword association assumptions, and/or the like. For example, the keyword "running shoes" may be assigned a monetary value of ten U.S. dollars. SEO revenue attribution may be calculated by multiplying the number of visits to the website with the value of the selected keyword (block 254 of FIG. 2D) to obtain an aggregate value for the selected keyword (block 255 of FIG. 2D). The aggregate value represents the value of the keyword to the entity aggregated over a period.

An understanding of the SEO Module 212 of FIG. 2A may be assisted by an example. As noted above, due to the recent transitions of some search engines to the use of secured search to provide encrypted communication previously noted, an entity associated with a website may not be able to determine the path a visitor took to arrive at the entity's website. For example, if a website selling shoes is visited by a visitor utilizing the secured search results page of the search engine website, the website entity will not be able to discover whether the user searched for "shoes," "running shoes," or some other phrase. However, an entity may be able to obtain some of keywords used to develop the organic search leading to visits to the entity's website, as shown in block 220 of FIG. 2A. Search engines, such as Google, may allow a website entity, or their assigned agents, to obtain the top 1000 keywords driving traffic to their website, by referencing such sites as Google Webmaster Tools. For each keyword listed, a determination of where the entity's website is ranked in the search results page resulting from a search of a selected keyword may be determined as illustrated in block 230 of FIG. 2A, and may utilize the steps illustrated in FIG. 2B.

Continuing the example above, the keyword "shoes" may return a search result that ranks the entity's webpage in tenth place, whereas the keywords "running shoes" may return a search result that ranks the entity's webpage in first place. A place of first or tenth is a ranking based on the relative position of the entity's webpage to the webpages of other websites listed within the search results webpage with the first place being located towards the topward portion of the search result webpage, and the tenth place being located nine places below the first place position. The entity may determine that a rank of first place, may translate into a certain percentage of visits to the entity's website, as shown in block 243 of FIG. 2C. A CTR can associate the rank of the entity's website in the search result webpage with visits to the entity's website for the selected keyword.

Continuing in the example above, the keyword "running shoes," having a ranking of first, may be assigned a CTR of 40%. In this example, the CTR of 40% represents that for every 100 times that the search results webpage for the keyword "running shoes" lists the entity's website in the first position, the entity's will receive 40 visits to the entity's website. Then, the total monthly number of searches is determined (shown in block 242 of FIG. 2C) for the keyword "running shoes," and may be 10,000 searches in this example. This total monthly number of searches for "running shoes" is multiplied (shown in block 244 of FIG. 2C) by the CTR of 40% in this example, to obtain an estimated number of visits (shown in block 245 of FIG. 2C) to the entity's website driven from the keyword search of "running shoes." Thus, the number of visits to the entity's website in this example is 4,000 visits for the past month. If the entity has assigned (shown in block 253 of FIG. 2D) the keyword "running shoes" a value of $10, then the number of visits (shown in 252 of FIG. 2D), being 4,000 visits, can be multiplied by the assigned value (shown in block 254 of FIG. 2D). Thus, for this example, the keyword "running shoes," has an aggregate value (block 255 of FIG. 2D) of $40,000.

The estimated SEO revenue attribution may be useful to the entity to identify keywords that are more valuable to their business. By identifying keywords that are more valuable to the entity and the entity's business, the entity and/or the entity's agents may focus on generating legitimate content within the entity's website to increase visits to the entity's website. In addition, the aggregate value obtained may allow the entity to analyze some keywords that may result in higher revenue if the keyword search resulted in a higher rank of an entity's webpage within search results webpages.

Some embodiments disclosed herein include a computer program product having computer-executable instructions for causing a computing system having the computer program product to perform a computing method of the computer-executable instructions for estimating SEO revenue attribution for keywords driving traffic to a website. The computing method can be any method described herein as performed by a computing system. The computer program product can be located on a computer memory device, which may be removable or integrated with the computing system.

Some embodiments include a computing system capable of performing the methods described herein. As such, the computing system can include a memory device that has the computer-executable instructions for performing the method.

In some embodiments, a computing device, such as a computer or memory device of a computer, can include a SEO module, a ranking module, an estimated visit module, a SEO revenue attribution module, and a reporting module. The SEO module, the ranking module, the estimated visit module, the SEO revenue attribution module, and the reporting module can be configured to perform any of the methods described herein. Also, the SEO module, the ranking module, the estimated visit module, the SEO revenue attribution module, and the reporting module can be combined into a single module or on a single platform.

In some embodiments, the SEO module, the ranking module, the estimated visit module, the SEO revenue attribution module, and the reporting module platform can be configured such that on-peak and off-peak search analysis can be accounted for. Thus, since page rank is dynamic and configured to change, the ranking module, the estimated visit module the SEO revenue attribution module, the reporting module, and thus the SEO Module platform may be configured to run dynamically. Alternately, the SEO module, the ranking module, the estimated visit module, the SEO revenue attribution module, and the reporting module platform may be configured to calculate an average or any other calculation designed to quantify aggregate dynamic data.

The methods described herein can be used for attribution of revenue to a keyword used in a search engine website driving traffic to the webpages of the website. Also, it can be used for attribution of revenue to a keyword used in two or more different search engines. Moreover, the attribution of revenue to a keyword can be done in view of higher used search engines, such as Bing, Google, and Yahoo search engines.

Some embodiments described herein include a computer program product having computer-executable instructions for causing a computing system having the computer program product to perform a computing method of the computer-executable instructions for obtaining revenue attribution to keywords driving traffic to webpages within a website. The computing method can be any method described herein as performed by a computing system. The computer program product can be located on a computer memory device, which may be removable or integrated with the computing system.

Some embodiments described herein include a computing system capable of performing the methods described herein. As such, the computing system can include a memory device that has the computer executable instructions for performing the method.

In some embodiments, a computing device, such as a computer or memory device of a computer, can include the SEO module, the ranking module, the estimated visit module, the SEO revenue attribution module, and the reporting module. The SEO module, the ranking module, the estimated visit module, the SEO revenue attribution module, and the reporting module can be configured to perform any of the methods described herein.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

FIG. 3 shows an example computing device 300 that is arranged to perform any of the computing methods described herein. In a very basic configuration 302, computing device 300 generally includes one or more processors 304 and a system memory 306. A memory bus 308 may be used for communicating between processor 304 and system memory 306.

Depending on the desired configuration, processor 304 may be of any type including but not limited to a microprocessor (µP), a microcontroller (µC), a digital signal processor (DSP), or any combination thereof. Processor 304 may include one more levels of caching, such as a level one cache 310 and a level two cache 312, a processor core 314, and registers 316. An example processor core 314 may include an arithmetic logic unit (ALU), a floating point unit (FPU), a digital signal processing core (DSP Core), or any combination thereof. An example memory controller 318 may also be used with processor 304, or in some implementations memory controller 318 may be an internal part of processor 304.

Depending on the desired configuration, system memory 306 may be of any type including but not limited to volatile memory (such as RAM), non-volatile memory (such as ROM, flash memory, etc.) or any combination thereof. System memory 306 may include an operating system 320, one or more applications 322, and program data 324. Application 322 may include a determination application 326 that is arranged to perform the functions as described herein including those described with respect to methods described herein. Program Data 324 may include determination information 328 that may be useful for analyzing webpage rank within a search engine results page. In some embodiments, application 322 may be arranged to operate with program data 324 on operating system 320 such that the work performed, such as the carrying out of the methods described, by untrusted computing nodes can be verified. This described basic configuration 302 is illustrated in FIG. 3 by those components within the inner dashed line.

Computing device 300 may have additional features or functionality, and additional interfaces to facilitate communications between basic configuration 302 and any required devices and interfaces. For example, a bus/interface controller 330 may be used to facilitate communications between basic configuration 302 and one or more data storage devices 332 via a storage interface bus 334. Data storage devices 332 may be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 306, removable storage devices 336 and non-removable storage devices 338 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 300. Any such computer storage media may be part of computing device 300.

Computing device 300 may also include an interface bus 340 for facilitating communication from various interface devices (e.g., output devices 342, peripheral interfaces 344, and communication devices 346) to basic configuration 302 via bus/interface controller 330. Example output devices 342 include a graphics processing unit 348 and an audio processing unit 350, which may be configured to communicate to various external devices such as a display or speakers via one or more A/V ports 352. Example peripheral interfaces 344 include a serial interface controller 354 or a parallel interface controller 356, which may be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which may be arranged to facilitate communications with one or more other computing devices 362 over a network communication link via one or more communication ports 364.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 300 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 300 may also be implemented as a personal computer including both laptop computer and non-laptop computer configurations. The computing device 300 can also be any type of network computing device. The computing device 300 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data, which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. It should also be recognized that any module or component described herein can implement the functionalities associated with the name of the module or component.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

What is claimed is:

1. A method to estimate visits from searches attributable to keywords when the keywords are no longer transmitted in webpage referrals from search engines due to secured search, the method comprising:
    identifying a webpage for which data is sought, the data relating to visits from searches attributable to keywords;
    identifying an entity reporting keywords actually used in secured internet searches;
    retrieving from the entity a keyword reported as actually used in a secured internet search that resulted in a visit to the webpage;
    obtaining percentage values associated with different positions of webpages on search result pages;
    obtaining a number of secured searches performed using the keyword;
    determining a position of the webpage on a search results page resulting from searching the keyword; and
    estimating a number of visits to the webpage that result from secured searches of the keyword based on the number of searches performed using the keyword and a percentage value associated with the position of the webpage on the search results page.

2. The method of claim 1, wherein the entity is a search engine that performed the secured search.

3. The method of claim 1, wherein the number of secured searches performed is obtained from the entity that performed the secured internet searches.

4. The method of claim 1, further comprising obtaining a value of the keyword to the webpage.

5. The method of claim 4, wherein the percentage value and the value of the keyword to the webpage are defined by a second entity that operates the webpage.

6. The method of claim 1, further comprising estimating an aggregate revenue value of the keyword based on the estimated number of visits to the webpage and a value of the keyword to the webpage.

7. The method of claim 1, further comprising estimating a number of conversions on the webpage based on the estimated number of visits to the webpage.

8. The method of claim 1, wherein identifying the webpage, retrieving, determining, and estimating are performed for a plurality of webpages, the plurality of webpages being identified by a website, a sub-domain, a sub directory, a URL pattern, or a grouping of webpages.

9. The method of claim 1, wherein the webpage is a landing page of a website.

10. A method to estimate revenue attributable to keywords when the keywords are no longer transmitted in webpage referrals from search engines due to secured search, the method comprising:
    identifying a webpage for which data is sought, the data relating to visits from searches attributable to keywords;
    identifying an entity reporting keywords actually used in secured internet searches;
    retrieving from the entity a keyword reported as actually used in a secured internet search that resulted in a visit to the webpage;
    obtaining search engine optimization data including at least one revenue attribution metric associated with the keyword;
    determining a rank of the webpage on a search results page resulting from searching the keyword;
    estimating, based on the rank of the webpage, a number of visits to the webpage that result from secured searches of the keyword; and
    generating a report indicating an aggregate value of the keyword, the report being based on the search engine optimization data and the estimation of the number of visits to the webpage.

11. The method of claim 10, wherein the entity is a search engine that performed the secured search.

12. The method of claim 10, further comprising obtaining a number of secured searches performed using the keyword from a search engine that performed the secured internet searches.

13. The method of claim 12 wherein the at least one revenue attribution metric includes a position value assigned to the rank of the webpage and a value of the keyword to the webpage.

14. The method of claim 13, wherein the number of visits to the webpage is estimated over a period based on the position value assigned to the rank of the webpage and the number of secured searches performed using the keyword over the period.

15. The method of claim 14, wherein the position value and the value of the keyword to the webpage are defined by a second entity that operates the webpage.

16. The method of claim 10, wherein the search engine optimization data further comprises one or more of:
   panel data;
   toolbar data;
   application programming interface (API) data;
   aggregated demographic data; and
   aggregated log data.

17. The method of claim 10, wherein identifying the webpage, retrieving, determining, and estimating are performed for a plurality of webpages, the plurality of webpages being identified by a website, a sub-domain, a sub-directory, a URL pattern, or a grouping of webpages, wherein the report indicates the aggregate value of the keyword for the plurality of webpages.

18. One or more non-transitory computer readable media encoded with computer-executable instructions to cause a computing system to perform operations to estimate visits from searches attributable to keywords when the keywords are no longer transmitted in webpage referrals from search engines due to secured search, the operations comprising:
   identifying a webpage for which data is sought, the data relating to visits from searches attributable to keywords;
   identifying an entity reporting keywords actually used in secured internet searches;
   retrieving from the entity a keyword reported as actually used in a secured internet search that resulted in a visit to the webpage;
   obtaining search engine optimization data including percentage values assigned to ranks of webpages on search result pages;
   determining a rank of the webpage on a search results page resulting from searching the keyword; and
   estimating a number of visits to the webpage that result from secured searches of the keyword based on a number of searches performed during a period using the keyword and a percentage value associated with the rank of the webpage.

19. The one or more non-transitory computer readable media of claim 18, wherein the search engine optimization data further includes a particular value of the keyword to the webpage and the operations further comprise calculating an aggregate value of the keyword by multiplying the estimated number of visits to the webpage by the particular value of the keyword to the webpage.

* * * * *